United States Patent
Ong et al.

(10) Patent No.: US 9,660,956 B2
(45) Date of Patent: May 23, 2017

(54) WIRELESS EXTENSION OF BROADBAND ACCESS

(75) Inventors: Ivan Ong, Jeffersonville, PA (US);
Clifton Lowery, Philadelphia, PA (US);
David Urban, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 445 days.

(21) Appl. No.: 12/872,717

(22) Filed: Aug. 31, 2010

(65) Prior Publication Data

US 2012/0051341 A1 Mar. 1, 2012

(51) Int. Cl.
*H04L 29/12* (2006.01)
*H04W 4/00* (2009.01)
*H04W 8/26* (2009.01)
*H04W 74/00* (2009.01)

(52) U.S. Cl.
CPC ...... *H04L 61/251* (2013.01); *H04L 29/12358* (2013.01); *H04L 61/2015* (2013.01); *H04W 4/001* (2013.01); *H04W 8/26* (2013.01); *H04W 74/004* (2013.01)

(58) Field of Classification Search
CPC . H04W 72/04; H04W 72/0406; H04W 28/04; H04W 4/001; H04W 8/26; H04W 74/004; H04L 61/251; H04L 61/2015; H04L 29/12358

See application file for complete search history.

(56) References Cited

U.S. PATENT DOCUMENTS

| | | |
|---|---|---|
| 8,228,861 B1 | 7/2012 | Nix |
| 8,254,930 B1 | 8/2012 | Mauer et al. |
| 2002/0172217 A1 | 11/2002 | Kadaba et al. |
| 2003/0212764 A1 | 11/2003 | Trossen et al. |
| 2003/0231861 A1 | 12/2003 | Yoo et al. |
| 2004/0037260 A1* | 2/2004 | Kakemizu ........... H04L 12/4641 370/338 |
| 2004/0103282 A1* | 5/2004 | Meier et al. ................... 713/171 |
| 2005/0074019 A1* | 4/2005 | Handforth et al. ........... 370/406 |
| 2005/0235308 A1 | 10/2005 | Dellow et al. |
| 2005/0265309 A1* | 12/2005 | Parandekar ......... H04L 12/2801 370/351 |
| 2006/0002370 A1* | 1/2006 | Rabie .................. H04L 12/4645 370/351 |
| 2006/0221897 A1* | 10/2006 | Nagy .................. H04L 12/4641 370/329 |
| 2007/0014259 A1 | 1/2007 | Fajardo et al. |

(Continued)

FOREIGN PATENT DOCUMENTS

WO 02/21841 A1 3/2002

OTHER PUBLICATIONS

BelAir Networks, Data Sheet, BelAir I 00S Strand-Mounted Wireless Multi-service Node, www.belairnetworks.com; BDMAI0020-B08, 2 pages.

(Continued)

*Primary Examiner* — Jianye Wu

(74) *Attorney, Agent, or Firm* — Banner & Witcoff, Ltd.

(57) ABSTRACT

Wireless extension of a wired network through the use of strand-mounted access nodes. In some aspects, private network addresses may be assigned to wireless devices, and corresponding data traffic may be routed to a centralized management/provisioning platform for further network access.

20 Claims, 3 Drawing Sheets

(56) References Cited

U.S. PATENT DOCUMENTS

| | | |
|---|---|---|
| 2007/0025295 A1 | 2/2007 | Kono |
| 2007/0147234 A1 | 6/2007 | Walter et al. |
| 2008/0250010 A1 | 10/2008 | Rathod |
| 2009/0093264 A1* | 4/2009 | Heredia et al. ............. 455/466 |
| 2009/0135843 A1* | 5/2009 | Veillette ..................... 370/406 |
| 2010/0085948 A1* | 4/2010 | Yu ........................ H04L 12/66 370/338 |
| 2010/0153985 A1 | 6/2010 | Dey |
| 2012/0278842 A1 | 11/2012 | Look et al. |
| 2014/0040950 A1 | 2/2014 | Clemente |

OTHER PUBLICATIONS

BelAir Networks, Data Sheet, BelAir I 00T Wireless Mesh Node, www.belairnetworks.com; BDMAI500I-A0I, 2 pages.
BP Tiwari: "Understanding WiMAX Network Architecture".
WiMAX Forum Network Architecturees.
Samhat et a: "Security and AAA Architecture for WiFi-WiMAX Mesh Network".
EP 11179627.2 Partial EP Search Report dated Jan. 31, 2012.
Saito T. et al., "Home Gateway Architecture and It's Implementation," IEEE Transactions on Consumer Electronics, IEEE Service Center, New York, NY, US; vol. 46, No. 4; Nov. 1, 2000; pp. 1161-1166.
EP 10187036.8, Office Action mailed Jan. 17, 2012.
EP 10187036, Search Report dated Jan. 14, 2011.
Response to European Office Action—EP 10187036.8—Dated May 28, 2015.
European Office Action—EP Appl. 10187036.8—dated Sep. 4, 2015.
European Office Action—EP Appl. 11179627.2—mailed Feburary 2, 2016.
Canadian Office Action—CA App 2,716,911—Dated Aug. 25, 2016.

* cited by examiner

WIRELESS EXTENSION OF BROADBAND ACCESS

FIELD OF ART

The features described herein generally relate to providing users with access to high speed data networks.

BACKGROUND

Today's high speed data connection is as important as yesteryear's dial tone. Just about every facet of life is now accessible and manageable via such a network, such as the Internet, and its importance is only going to grow over time as more and more devices become 'smart' and connected.

Reaching the network requires, of course, a data connection to a server that is on the Internet; be it via fiber optic cable, coaxial cable, wireless, satellite, cellular, or other network. And whichever network type is chosen for that data connection, there are invariably geographic areas that are not well covered by the network. For example, fiber optic and coaxial cable networks can only reach locations that have those underground cables. Digging up earth and laying those cables is an expensive task, and expansion of those networks is slow, so anyone who happens to be outside of the cable network's coverage area may be out of luck.

In many homes, local wireless access nodes (e.g., wireless "hotspots") can be installed to help extend the reach of the network to bedrooms, basements, etc. that are not within easy reach of the home's wiring outlets, but those are not a perfect solution either. Wireless access nodes often have a limited range that is only really suitable for indoor, same-premises deployment, and their decentralized nature can lead to maintenance difficulties as more and more homes deploy different kinds of wireless equipment from different vendors.

There is, and probably always will be, a need for an improvement in expanding network access to more and more locations.

SUMMARY

This summary is not intended to identify critical or essential features of the inventions claimed herein, but instead merely summarizes certain features and variations thereof.

In some embodiments, a wireless network provisioning server may be used to manage multiple wireless networks from multiple strand-mounted wireless access nodes located in multiple geographic neighborhoods. The various strand-mounted nodes may establish secure tunnel links with the provisioning server, and can use that tunnel to carry traffic to and from one or more consumer devices that are wirelessly connected to the access nodes.

The provisioning server may assign private network addresses to the various consumer devices, and the private addresses may be used within the networks managed by the server. External networks might not use the private addresses, and the server (or a different server) may convert between public and private addresses to support communications of the consumer devices.

In some embodiments, all wireless traffic from a consumer device may be funneled through a centralized wireless network management platform, which may perform the address conversion noted above.

In some embodiments, the strand-mounted access node may include multiple radio circuits, such as separate ones for access and mesh communications. The access radio may be used for communications between a consumer device and the node, while the mesh radio may be used for communications between the nodes. The mesh radio may use the same or different bandwidth protocols as that used by the access radios—in some embodiments the mesh radio may use a higher-bandwidth protocol.

A node may support multiple virtual wireless networks, and may allow different wireless network connections from different consumer devices. For this purpose, a given node may broadcast multiple different wireless network identifiers, and may tag network traffic with different virtual wireless network identifiers based on the virtual network to which the consumer device is connected.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
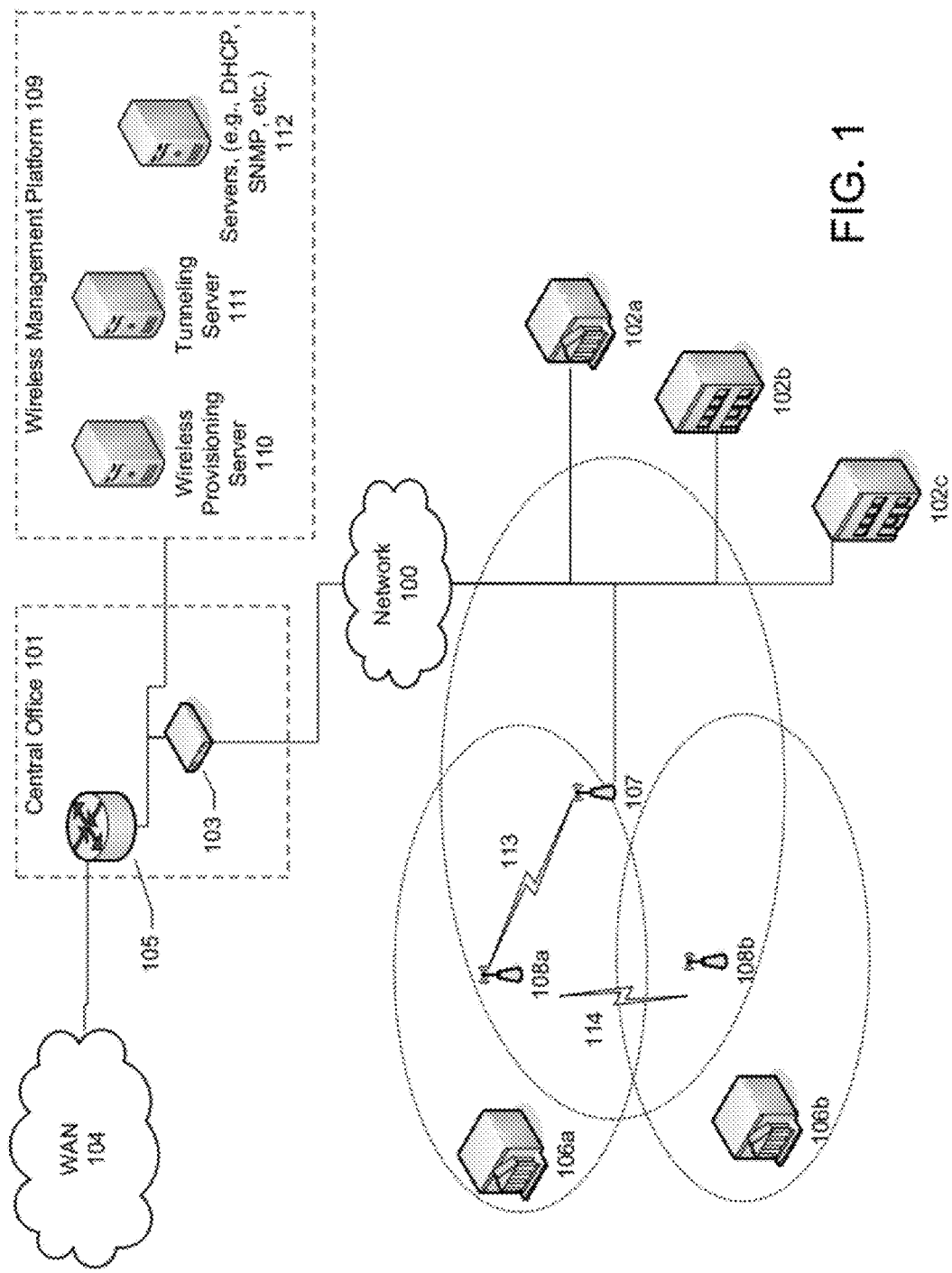
FIG. 1 illustrates an example system on which various features described herein may be implemented.

FIG. 1 illustrates an example communication system in which various features herein may be implemented. The system may include, for example, one or more information distribution networks 100. The network 100 may be any type of data or content distribution network, employing any type or combination of communication links. For example, the network 100 may be a wireless, fiber optic, coaxial cable and/or hybrid fiber/coax (HFC) network of cables, wires and wireless communication links, connecting a central office 101 (e.g., a headend) and a plurality of premises 102a-d (e.g., homes). Elements 102a-d may also represent neighborhoods of city blocks, streets, zones, etc., business establishments, etc. At each premise or neighborhood 102a-d, there may be a network access device (e.g., coaxial cable modem, fiber termination node, wireless node, telephone network interface unit, etc.), which may communicate over the network 100 with a matching device 103 at the central office 101. That central office matching device 103 may be, for example, a termination server (e.g., a Data Over Cable Service Interface Specification Cable Modem Termination Server—DOCSIS CMTS in an HFC type network).

The various premises 102a-c may use their connection to the network 100 to access each other, the central office 101, and any other servers over any other wide area network 104. The wide area network 104 may be, for example, any network of Internet Protocol devices, a telephone network, satellite network, fiber optic network, a local WiFi network (e.g., WiMAX), cellular telephone, etc., and may use a gateway access router 105. The router 105 can be, for example, any gateway computing device with an interface to the WAN 104 (e.g., an Internet gateway). The WAN 104 can also include local connection types, such as Ethernet, Firewire, etc.

Users at premises 102a-c may happily use their premises' network connections to access the network 100, but other premises 106a-b might be too far away from the network 100's wires to be connected. To extend the network 100's reach to those premises, the system may include one or more wireless nodes, such as primary node 107 and secondary nodes 108a-b.

The primary node 107 may be a strand-mounted wireless access node, having a network access interface similar to those at premises 102a-c (e.g., a modem, network interface unit, etc.) to connect to the network 100. Additionally, the primary node 107 may have wireless circuitry to wirelessly communicate with other devices, and may allow those devices to access the network 100 through the node 107's own network access interface. The wireless circuitry can include any desired wireless type, such as IEEE 802.11 or 802.16 compliant circuitry, and can be configured to use any desired portion of the electromagnetic spectrum (e.g., licensed and/or unlicensed portions of the spectrum) to allow wireless access to the network 100 by far away premises 106a-b. In FIG. 1, each wireless node 107/108 is illustrated with a range of coverage, and the overlapping ranges allow wireless extension of wireless network coverage.

The secondary nodes 108a-b may contain similar wireless circuitry as in the primary node 107, but may omit the wired network access interface for connecting to network 100. Instead of directly connecting to network 100, these secondary nodes 108a-b may wirelessly connect to the primary node 107, and use node 107 to eventually connect to network 100. The secondary nodes 108a-b may also include wireless circuitry to connect to various pieces of consumer premises equipment (CPE). Those CPEs may connect to the secondary node 108, which in turn may connect to the primary node 107, which in turn may connect to the network 100, and by virtue of these connections the CPEs can gain access to the network 100.

The primary and secondary nodes 107/108 may form a wireless mesh network, consolidating the wireless access so that the various wireless access points 107/108 may have common characteristics (e.g., SSIDs, profile configurations, etc.) to simplify their use. The nodes within the mesh (e.g., 107/108) may communicate with one another so that, for example, if the link between nodes 108a and 107 becomes unusable due to interference, node 108a can transmit its data to node 108b, and node 108b may forward it on to node 107. In some embodiments, these nodes may support multiple wireless mesh networks, each having different protocols and/or identifiers (e.g., SSIDs). One mesh network may be used to create a wireless backhaul link (e.g., a communication link that can be used to carry signals back to a central office or other server) to connect the nodes 107/108 to one another, while the other may be used to connect user devices and CPEs to the nodes (107/108). For example, a higher bandwidth wireless format may be used for the backhaul links, and a lower bandwidth format may be used for the CPE devices, since the backhaul links will be carrying more data traffic. In some embodiments, the backhaul links may be implemented as direct point-to-point network connections, instead of a mesh.

To coordinate the various wireless nodes and networks, the network 100 may include a wireless management platform 109 that generally manages the various wireless networks for the various premises or neighborhoods serviced by nodes 107/108. The platform 109 may be co-located with the central office 101, or it may be wired or wirelessly connected via a local or wide area network. The platform 109 itself may include one or more computer servers, configured to perform the various functions described herein. One server may be the wireless provisioning server 110. The wireless provisioning server 110 may be responsible for managing the allocation of Internet Protocol (IP) addresses to wireless devices coming on the network, and for managing those networks (as will be described below). The platform 109 may also include one or more tunneling servers 111. The tunneling servers 111 may be configured to terminate and administer secure communication tunnels or links with various devices on the network 100. For example, the server 111 may be a Layer 2 Tunneling Protocol (L2TP) termination server, configured to establish an L2TP secure tunnel with the primary node 107. Any desired type of secure communication server can be used.

The platform 109 may also include other servers 112, which can be configured to assist with DHCP IP address assignments, domain name lookup operations, etc. The various servers are illustrated separately for convenience, but in practice they may be combined/subdivided in any desired manner. The description herein may generally attribute the various server functions to the wireless management platform 109 as a whole, but the ultimate responsibilities may be divided and shared among the plurality of servers.

Figure 2:
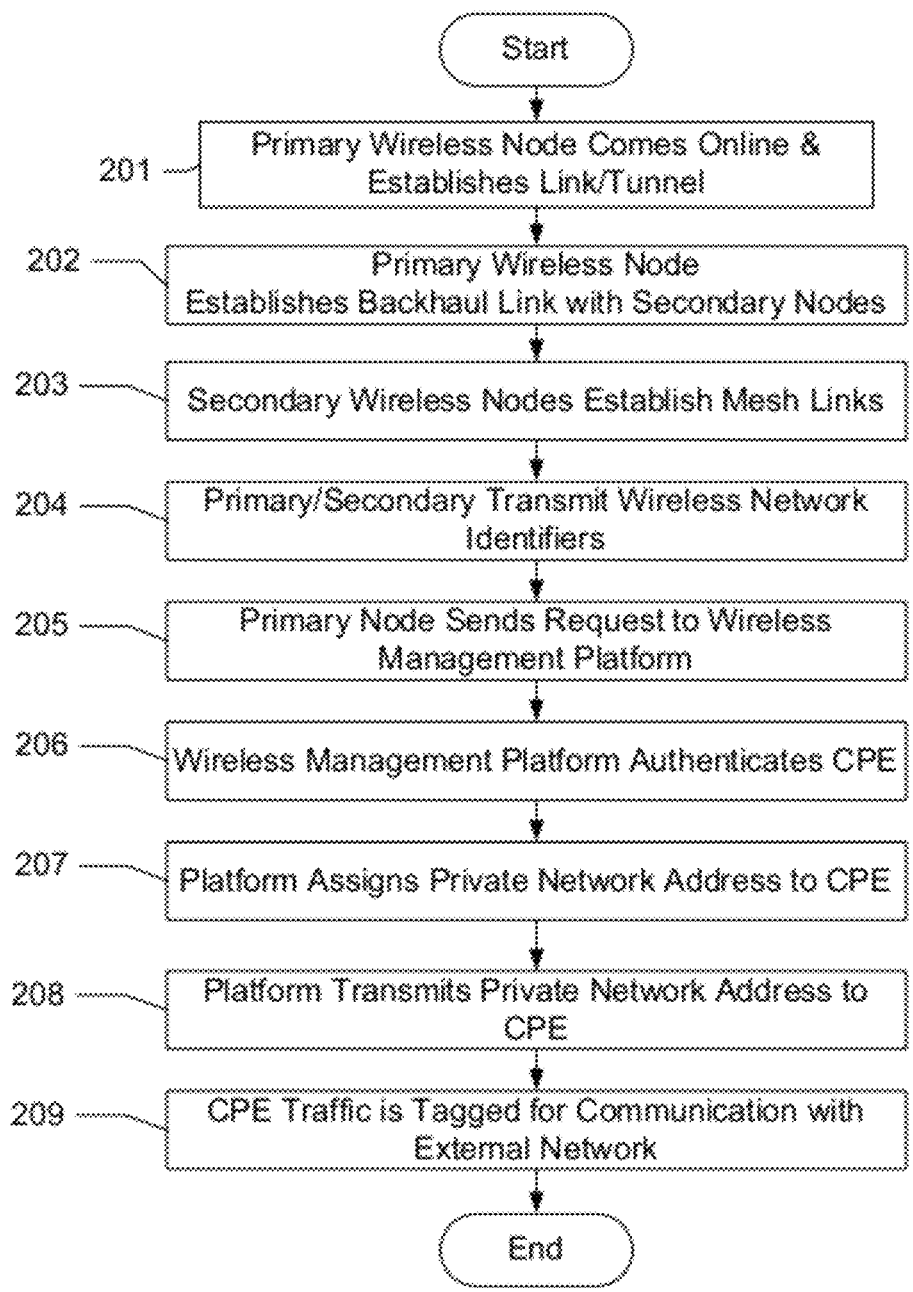
FIG. 2 illustrates an example process for extending the range of a broadband network.

FIG. 2 illustrates an example flow diagram for extending the broadband access of network 100. The example process in FIG. 2 begins with a primary wireless node (e.g., 107 in this example) coming online in step 201. As noted above, the primary node 107 may have a direct connection to the network 100, such as through a modem or other network interface device (e.g., DOCSIS, fiber, Ethernet, etc.), and may also have wireless circuitry. When the primary node 107 comes online (e.g., initially connected, powered on, etc.), it can establish a communication link with the network 100, such as, in an example of an HFC-type network, by establishing a DOCSIS connection via a matching device, such as a CMTS 103. First-time modems may undergo a more detailed provisioning process with the CMTS, which may include providing modem identification information (e.g., a media access control—MAC—address), and user authentication.

As part of coming online, the primary node 107 (or a CPE within the node 107) may be assigned an Internet Protocol address by the provisioning server 110 (which may use a DHCP server as well for this). The primary node 107's IP address may be a private one managed by the wireless provisioning server 110. For example, the server 110 may, through the gateway 105, have a single public IP address that is registered with domain name servers out on the WAN 104 (e.g., the Internet), and it can manage (or create) a listing of private IP addresses. The private IP addresses might not be registered on servers out on the WAN 104, but rather may be addresses that are assigned by the provisioning server 110 for use within the wireless network managed by the wireless management platform 109.

The primary node 107 (or, a CPE within the node 107) may also establish a secure tunnel for communications with the tunneling server 111. As noted above, this may be any desired type of secure communications link, such as a Layer 2 Tunneling Protocol (L2TP) tunnel. With the tunnel in place, the primary node 107 may securely communicate with the tunneling server, and the other devices of the wireless management platform.

Once the primary node 107 is up and running on the network 100, the primary node 107 may then establish a wireless backhaul link 113 with one or more secondary wireless extension nodes 108a-b in step 202. This link can be made using any desired wireless technology and any desired wireless format. So, for example, licensed or unlicensed spectrum ranges may be used, and formats may be, for example, IEEE 802.11 or 802.16 (among others). The secondary nodes 108a-b may use this backhaul wireless link to communicate with the primary node 107 and ultimately access the network 100. In some embodiments, the backhaul link 113 may include wired portions as well.

In step 203, the various secondary nodes 108a-b may also establish wireless mesh links 114 with one another. The mesh links 114 may be in the same type/format/protocol as the wireless backhaul links created in step 202, and may allow any of the nodes 107/108 to communicate with one another as a mesh network. The mesh network permits rerouting of signaling in case any particular wireless link becomes unusable (e.g., due to interference). For example, if the wireless link between nodes 108a and 107 is unusable due to interference, the nodes may use node 108b as an intermediary, passing signals to each other via node 108b.

In step 204, once the mesh network is up and running, the various wireless nodes 107/108 may transmit, e.g. broadcast, their wireless network identifiers (e.g., wireless SSIDs), and may begin receiving connection requests from various pieces of customer premises equipment (CPEs, such as portable laptops, computers, display devices, mobile phones, personal data assistants, etc.). In some embodiments, the nodes may broadcast different network identifiers to support multiple different types of wireless networks. For example, node 108a may broadcast one identifier (e.g., "Comcast_Wireless") intended for use by customers of one service, and another identifier (e.g., "Starbucks_Network") intended for use by customers of another service, and may support the two different types of wireless network concurrently. Different CPEs may log in to different wireless networks, depending on their own configuration and service subscription level.

If the CPE connected to a secondary wireless node 108, then the secondary node 108 may use the backhaul wireless connection to transmit the connection request to the primary access node 107. The primary node 107 may, in step 205, place this request onto the upstream transmission portion of network 100, and, for example, in the secure tunnel that was established with the wireless management platform 109. The primary node 107 may also do this for the CPEs that have directly connected to the node 107.

When sending the request to the wireless management platform 109, the primary node 107 may add a network identifier to the request, so that the request identifies the particular wireless network to which the CPE wishes to connect. For example, the different SSIDs ("Comcast_Wireless" and "Starbucks_Network") may correspond to different virtual network identifiers (e.g., a bit value of "0001" and "0010," respectively). The request may also include information identifying the CPE (e.g., a media access control unique address, serial number, model number, etc.), CPE user (e.g., a name, account number, etc.), and/or the node 107/108 to which the CPE is connected.

In step 206, the wireless management platform 109 may receive the request, decrypt/decode the data according to the appropriate tunneling protocol, and then authenticate the requesting CPE for the identified network. The authentication may involve, for example, comparing the information identifying the CPE, CPE's user, or wireless node 107/108 with a listing of authorized CPEs, users, or nodes for the particular network. For example, the platform 109 may store a list of approved identities for each network.

If the authentication fails, then the process may simply terminate with respect to that requesting CPE. However, if the authentication passes, then the platform 109 may assign a private network address (e.g., private IP address) to the requesting CPE in step 207, and transmit that private address to the CPE in step 208. The private address may be an address that is uniquely assigned to a single device in the wireless network of the nodes 107/108, or on network 100. This unique address need not be globally unique on the WAN 104, and may simply be unique within the network managed by platform 109. In contrast, a public address would be one that is uniquely assigned to a device on the WAN 104, such that messages addressed using the public address on the WAN 104 would be routable to a specific end point. So, for example, a packet sent to an WAN 104 server containing a public address destination would be routable to the eventual destination because the routers on the WAN 104 would know which device has that public address, but a packet containing a private address would not, because the routers on the WAN 104 (e.g., the Internet) do not associate the private address with any specific device.

From that point, the CPE may use its private network address to communicate on the wireless virtual network. Outgoing packets from the CPE can include the CPE's private network address as a sender address, and can be sent up through the tunnel to the wireless management platform 109. In the platform 109, an address translation server (e.g., within DHCP server 112) may repackage the outgoing packet with a different sender address, and may add payload information identifying the actual CPE that sent the packet. The different sender address used for this purpose can be a public network address that is routable on the WAN 104. That public network address can be, for example, an address assigned to a server within the management platform 109 that manages wireless communication for a particular virtual wireless network. For example, the "Comcast_Network" virtual wireless network may have its own server in the management platform 109, and that server may be responsible for translating or tagging upstream packets with its own public network address.

Incoming packets from the Internet may arrive at a virtual network's server using the server's public address, and the server may convert the public address into a private one based on additional identifying information contained in the incoming packet. The server can then prepare a new incoming packet, addressed to the CPE (or to the node 107/108) by its private network, and then transmit it downstream to the node 107/108 and CPE.

Figure 3:
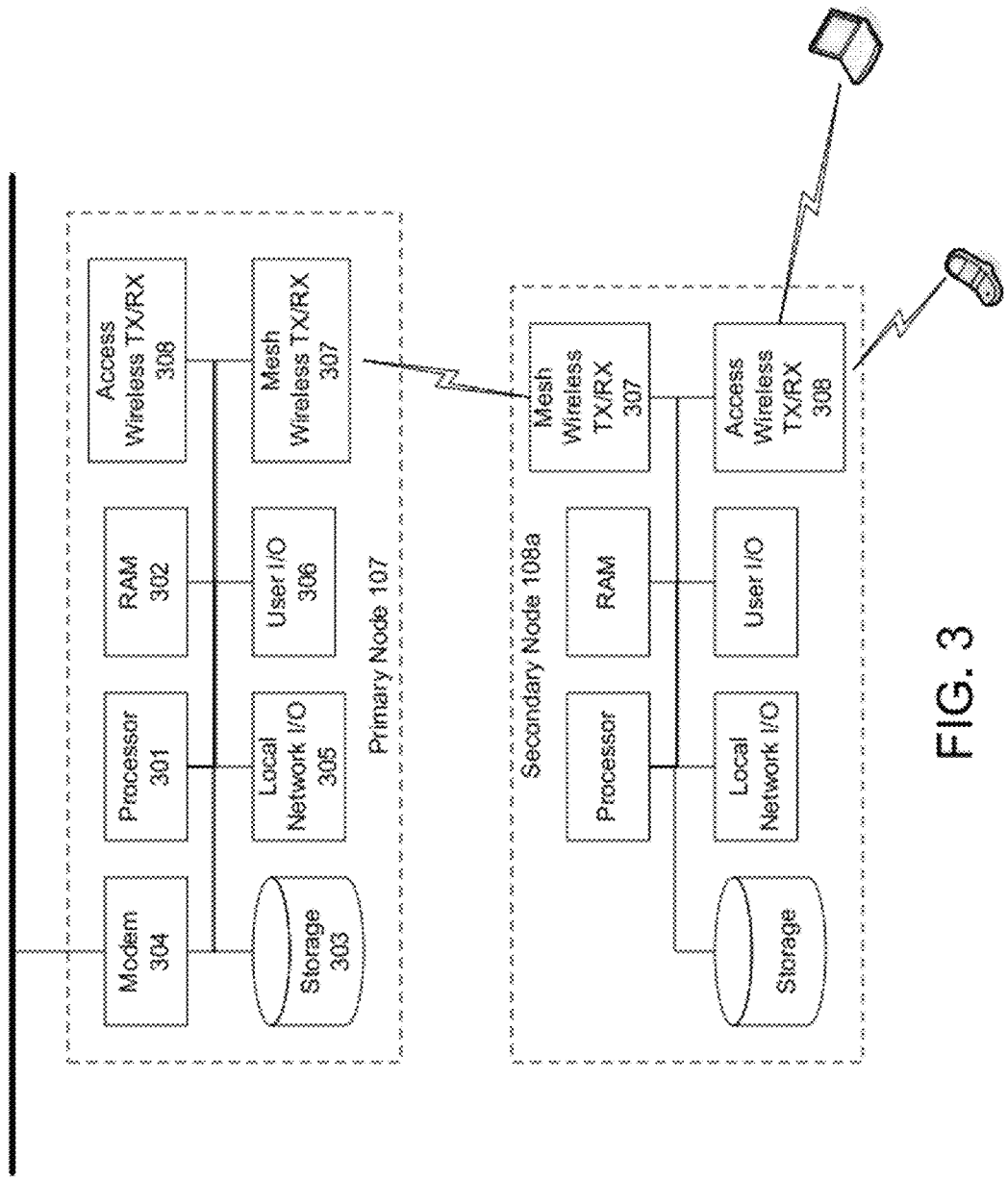
FIG. 3 illustrates internal components of an example primary and secondary wireless node, and associated computing devices.

The process in FIG. 3 concludes with this communication, although steps may be repeated as desired for the addition of new nodes and/or CPEs, and the process may continue with the termination or signing off of certain CPEs or nodes.

FIG. 3 illustrates internal components of an example primary node 107 and secondary node 108a. The primary node 107 may include, at its core, one or more processors 301. The processors 301 may execute instructions, stored in a computer-readable medium such as RAM 302 and storage 303, to cause the node to perform any of the steps and features described herein. The RAM 302 and storage 303 may be implemented using any desired type of computer-readable medium. For example, they can be flash, hard disks, floppy disks, optical compact disks, etc.

The primary node 107 may include a network interface device, such as a modem 304, which can be connected to the network 100. Other types of interfaces, such as fiber, Ethernet, WiMax, etc., may also be used.

The node 107 may also include local network input/output interfaces 305, to allow the node to connect to any additional desired type of communication network. For example, the node may include an Ethernet interface, a fire-wire (IEEE 1394) interface, Bluetooth, local wireless, etc.

The node may also include one or more user interface components 306. The user interface components 306 may be any desired type to allow interaction with users. For example, keyboards, mice, touch screens, microphones, speakers, etc. can be included.

The node may also include its mesh wireless transmission/reception radio circuitry 307. The mesh radio circuitry may be any desired type, such as IEEE 802.11 or 802.16, using licensed or unlicensed portions of the electromagnetic spectrum. As discussed above, the mesh radio may be used to form the point-to-point link between the primary node and one or more secondary nodes. The node may also include access radio circuitry 308. The access radio circuitry 308 may use similar wireless protocols as the mesh circuitry 307, or it may be different, and it may be used to connect with various CPEs in the range of the node.

The secondary node 108a, or access node, may contain many of the same types of elements as found in the primary node, such as one or more processors, storage media, interfaces, and mesh radio circuitry. The secondary node may also have, however, one or more access radio circuits 308. The access radio circuit 308 may contain wireless circuitry (e.g., IEEE 802.11) to communicate with any desired customer premise equipment (CPE) within range. As discussed above, this access radio allows those CPEs to access the network 100 via the mesh radio 307 and modem 304 of the primary node 107.

Although the FIG. 3 example components are illustrated in the context of an access node, the various servers, platforms, and other computing elements described above can be implemented using similar arrangements of processors, memories, and network interfaces, with the processors executing instructions stored on the memories to result in the performance of any of the steps and features described herein.

The examples described above are merely that—examples. Various modifications can be made as desired as well, such as the addition and/or removal of elements, the combining and/or dividing of elements, and the rearranging of elements. The true scope of this patent should not be limited by these examples, but rather, the scopes of each of the following claims.

The invention claimed is:

1. A method comprising:
   wirelessly receiving, by a first device, via a first virtual wireless network, and from a first wireless access node configured to concurrently route packets associated with the first virtual wireless network and packets associated with a second virtual wireless network, a first packet;
   wirelessly receiving, by the first wireless access node and via the second virtual wireless network, a second packet;
   tagging the first packet with a first network identifier assigned by a provisioning server to the first virtual wireless network;
   tagging the second packet with a second network identifier different from the first network identifier;
   sending, by the first wireless access node and to the provisioning server, the tagged first packet and the tagged second packet; and
   receiving, by the first wireless access node and from the provisioning server, a network address assigned to the first device for use on the first virtual wireless network.

2. The method of claim 1, wherein the second network identifier is a network identifier assigned by the provisioning server to the second virtual wireless network.

3. The method of claim 1, wherein the wirelessly receiving the second packet comprises wirelessly receiving, from a second wireless access node, the tagged second packet.

4. The method of claim 3, wherein the wirelessly receiving the second packet comprises receiving the second packet via a mesh network comprising a plurality of wireless access nodes that redundantly interface the first wireless access node and the second wireless access node.

5. The method of claim 3, wherein the first wireless access node is a strand-mounted access node comprising a wired network interface to a wired network.

6. The method of claim 5, wherein the wired network comprises at least one fiber-optic link.

7. The method of claim 3, further comprising:
   sending, by the second wireless access node and to the provisioning server, the second packet.

8. The method of claim 7, further comprising:
   determining, by the provisioning server and based on the first network identifier, that the first packet was received via the first virtual wireless network; and
   determining, by the provisioning server and based on the second network identifier, that the second packet was received via the second virtual wireless network.

9. The method of claim 1, wherein the first virtual wireless network uses a first protocol and the second virtual wireless network uses a second protocol, wherein the first protocol and the second protocol are different.

10. The method of claim 1, wherein the first packet comprises a request for the network address from the provisioning server.

11. A method comprising:
    receiving, by a computing device via a wired network interface of a first access node, a first packet comprising a tag, assigned by a provisioning server, indicating a first virtual wireless network of a first plurality of virtual wireless networks, wherein the first packet is provisioned by the computing device and concurrently routed by the first access node;
    receiving, by the computing device and from a second access node via the first access node, a second packet comprising a tag indicating a second virtual wireless network, wherein the second packet is routed by the second access node, wherein the second access node communicates with the first access node via a direct wireless network interface of the first access node;
    determining, by the computing device and based on the tag indicating the first virtual wireless network, that the first packet was wirelessly sent to the first access node via the first virtual wireless network; and
    determining, by the computing device and based on the tag indicating the second virtual wireless network, that the second packet was wirelessly sent to the second access node by a user device via the second virtual wireless network; and
    assigning, by the computing device and from the provisioning server, a network address for the user device to use on the second virtual wireless network.

12. The method of claim 11, further comprising:
    receiving, by the computing device and from the first access node, a third packet comprising a tag indicating a third virtual wireless network; and determining, by the computing device and based on the tag indicating the third virtual wireless network, that the third packet was sent via the third virtual wireless network.

13. The method of claim 11, further comprising:
receiving, by the computing device and via the first access node and the second access node, a third packet wirelessly received by a third access node subsequent to the third access node failing in an attempt to transmit the third packet directly to the first access node.

14. The method of claim 13, wherein the first access node, the second access node, and the third access node are redundantly connected via a mesh network comprising a plurality of access nodes.

15. A network device configured to concurrently route packets associated with a first virtual wireless network and a second virtual wireless network, comprising:
a processor; and
a memory storing instructions that, when executed by the processor, cause the network device to:
 wirelessly receive, from a first device, by a first wireless access node, and via the first virtual wireless network, a first packet;
 wirelessly receive, via the second virtual wireless network, a second packet;
 tag the first packet with a first network identifier assigned by a provisioning server to the first virtual wireless network;
 tag the second packet with a second network identifier different from the first network identifier;
 send, to the provisioning server, the tagged first packet and the tagged second packet; and
 receive, from the provisioning server, a network address assigned to the first device for use on the first virtual wireless network.

16. The network device of claim 15, wherein the instructions, when executed by the processor, further cause the network device to:
receive one or more packets via a mesh network redundantly interfacing the network device with a plurality of wireless access nodes.

17. The network device of claim 16, wherein the instructions, when executed by the processor, further cause the network device to:
in response to a connection loss between the network device and a first node of the plurality of wireless access nodes, establish a connection with the first wireless access node via a second wireless access node of the plurality of wireless access nodes.

18. The network device of claim 15, comprising a wired network interface and a wireless network interface, wherein sending, to the provisioning server, the tagged first packet and the tagged second packet comprises sending the tagged first packet and the tagged second packet via the wired network interface.

19. The network device of claim 15, wherein the instructions, when executed by the processor, further cause the network device to:
forward, to the provisioning server, a third packet wirelessly received by the network device and from a second wireless access node.

20. The network device of claim 19, wherein the instructions, when executed by the processor, further cause the network device to:
receive, from the provisioning server, a response to the third packet; and
forward the response to the second wireless access node.

* * * * *